Patented Aug. 10, 1926.

1,595,414

UNITED STATES PATENT OFFICE.

THOMAS B. MOHLER, OF SAN MATEO, CALIFORNIA.

METHOD OF OBTAINING PRODUCT HAVING CHARACTERISTICS OF HARD RUBBER FROM VEGETABLE MATTER.

No Drawing.   Application filed June 28, 1924. Serial No. 723,039.

This invention relates to the treatment of vegetable matter containing the natural gums in order to produce from such vegetable matter, a valuable product which has a semblance to and characteristics of hard rubber, or a substitute wood or plastic-like substance, the said product being subject to uses of hard rubber, substitute wood and plastic-like substances.
The invention contemplates the production of a valuable product of the character described from all vegetable matter containing the natural gums, but particularly, however, such vegetable matter which may be readily, easily and cheaply obtained in abundance, for example, weeds of the perennial variety, also other plants which grow or can be grown in abundance, the method of the process being simple and subject to being expeditiously and inexpensively carried out.

Vegetable matter, either green or dried, may be employed in carrying out this invention. In carrying out the invention, vegetable matter containing natural gums is treated in a retort under pressure with water and an agent for releasing the natural gums, for example an alkaline or metallic carbonate or bicarbonate, to reduce the vegetable matter to a homogeneous or plastic mass, which mass is subject to being pressed into blocks, slabs or sheets simulating hard rubber, substitute wood or plastic-like material. The addition of water is necessary to provide a moisture sufficient to carry the gums in solution and to prevent charring of the mass. Steam may be used in place of water, as by the use of steam sufficient moisture for the purpose above mentioned may be obtained. The proportion of carbonates or bicarbonates is such as to cause a release of the gums and the proportion may vary dependent on the material used.

I have found that the following treatment will give excellent results. I place green vegetable matter in a retort, for example, a weed growth of the mallow family may be employed, and to each green pound of this vegetable matter I add approximately 4 ounces of water (or equivalent amount of steam) and also add approximately 2½ grammes of bicarbonate of soda. I find that bicarbonate of soda gives the desired result in releasing the gums but may use carbonates or bicarbonates of the alkali or metallic group in the proportions such as is necessary to release the gums in accordance with the requirements of this invention. This mass of vegetable matter, water and bicarbonate of soda is subjected to a temperature of approximately 402° F., while in the retort, for a period of approximately one hour. The temperature may be varied but I have found that treating the vegetable matter with the water and gum releasing agent defined, in the proportions and for the length of time mentioned, at approximately 402° F., results in a satisfactory digestion of the vegetable matter and a releasing of the natural gums such that when the entire mass is removed from the retort, it may be molded or shaped into definite form.

On removal of the mass it is molded, preferably under pressure, into slabs, blocks, strips or plate-like form, so that it has the semblance of hard rubber, substitute wood or substance of a plastic nature. To finally prepare the product for use, these strips, blocks, plates or sheets of material are dried in an air or vacuum oven at a temperature of from approximately 100° F., upwardly. I find that 150° F. is quite effective for the purpose of drying and hardening of the product.

In some instances, it may be desirable to eliminate the drying step in the oven and this may be done as, for example, in the preparation of large slabs or sheets of the material for use as wall-board, sheathing, and the like.

Where the product of the invention is to be made with dry vegetable matter, the proportions of water and gum releasing agent, or other carbonate or bicarbonate of the alkali or metallic variety, to the amount of vegetable matter are increased approximately 10 times, the method or process being otherwise as described in the treatment of the green vegetable matter.

The treatment of vegetable matter under the method of this invention brings about a release of the natural gums and presents such gums and the solids in the form of a plastic mass wherein on pressing or molding of the mass, the gums will serve as an effective binder. One of the characteristics of the product is that it will not appreciably shrink or warp on being dried and for this reason in the molding or pressing of the mass into form, various fancy or decorative figures or structural forms may be pressed, molded, or set up.

If it is desired to produce an exceptionally hard product of the nature described, I add a small proportion of metallic carbonates, for example, approximately one gramme of corbonate of iron to each green pound of vegetable matter or 10 grammes to each dry pound, the method of treatment being otherwise as previously described.

The plastic homogeneous mass produced after the treatment in the retort may be incorporated with other materials and pressed into definite form, it serving as a binder in such instances.

I claim:

1. The method of obtaining a product having the characteristics of hard rubber, substitute wood or other plastic-like substances, which consists in treating vegetable matter with water and an agent which will release the natural gums of the vegetable matter in a retort for a period of approximately one hour at a temperature of approximately 400° F., removing the treated mass and molding the mass under pressure into the desired form.

2. The method of obtaining a product having the characteristics of hard rubber, substitute wood or other plastic-like substances, which consists in treating vegetable matter with water and an agent which will release the natural gums of the vegetable matter in a retort for a period of approximately one hour at a temperature of approximately 400° F., removing the treated mass and molding the mass under pressure into the desired form and then drying the molded mass.

3. The method of obtaining a product having the characteristics of hard rubber, substitute wood or other plastic-like substances, which consists in treating vegetable matter with water and an agent which will release the natural gums of the vegetable matter in a retort for a period of approximately one hour at a temperature of approximately 400° F., removing the treated mass and molding the mass under pressure into the desired form and then drying the molded mass in a vacuum oven at a temperature of from 100° F., upward.

4. The method of obtaining a product having the characteristics of hard rubber, substitute wood or other plastic-like substances, which consists in treating the vegetable matter containing the natural gums with water and bicarbonate of soda in the proportions of 4 ounces of water to each green pound of vegetable matter and 2½ grammes of bicarbonate of soda to each green pound, then subjecting said mixture to a temperature of approximately 400° F., for approximately one hour then molding the treated mass in the desired form.

5. The method of obtaining a product having the characteristics of hard rubber, substitute wood or other plastic-like substances, which consists in treating the vegetable matter containing the natural gums with water and bicarbonate of soda in the proportions of 4 ounces of water to each green pound of vegetable matter and 2½ grammes of bicarbonate of soda to each green pound, then subjecting said mixture to a temperature of approximately 400° F., for approximately one hour, then molding the treated mass in the desired form and then drying the molded mass in a vacuum oven.

6. The method of obtaining a product having the characteristics of hard rubber, substitute wood or other plastic-like substances, which consists in treating vegetable matter with water and bicarbonate of soda in a retort at a temperature of approximately 400° F., for a period of approximately one hour, removing the treated mass from the retort then subjecting the mass to pressure to cause the same to take a predetermined form.

7. The method of obtaining a valuable product from vegetable matter which consists in treating vegetable matter with water and bicarbonate of soda in a retort in a temperature of approximately 400° F. for a period of approximately one hour.

THOMAS B. MOHLER.